US012291434B2

(12) United States Patent
McPherson

(10) Patent No.: US 12,291,434 B2
(45) Date of Patent: May 6, 2025

(54) MOBILE CRANE

(71) Applicant: TEREX AUSTRALIA PTY LTD, Queensland (AU)

(72) Inventor: Clayton McPherson, Queensland (AU)

(73) Assignee: Terex Australia Pty Ltd, Queensland (AU)

( * ) Notice: Subject to any disclaimer, the term of this patent is extended or adjusted under 35 U.S.C. 154(b) by 223 days.

(21) Appl. No.: 17/623,183

(22) PCT Filed: Oct. 14, 2020

(86) PCT No.: PCT/AU2020/051103
§ 371 (c)(1),
(2) Date: Dec. 27, 2021

(87) PCT Pub. No.: WO2021/072489
PCT Pub. Date: Apr. 22, 2021

(65) Prior Publication Data

US 2022/0356050 A1 Nov. 10, 2022

(30) Foreign Application Priority Data

Oct. 15, 2019 (AU) ................................ 2019903890

(51) Int. Cl.
*B66C 23/36* (2006.01)
*B66C 23/70* (2006.01)

(52) U.S. Cl.
CPC ............ *B66C 23/36* (2013.01); *B66C 23/701* (2013.01); *B66C 2700/0378* (2013.01); *B66C 2700/062* (2013.01)

(58) Field of Classification Search
CPC ......... B66C 23/36; B66C 23/62; B66C 23/46; B66C 2700/0378; B66C 2700/062
See application file for complete search history.

(56) References Cited

U.S. PATENT DOCUMENTS 2,510,636 A * 6/1950 Johnson ................. B66F 9/061
212/261
3,120,310 A 2/1964 Roberts et al.
(Continued)

FOREIGN PATENT DOCUMENTS

CN 208648584 U 3/2019
KR 101395277 B1 5/2014
WO 2018049475 A1 3/2018

OTHER PUBLICATIONS

Extended European Search Report re EP App. No. 20876725.1-1017 / 4045452 (PCT/AU2020051103), Applicant: Terex Australia Pty Ltd, dated Oct. 27, 2023 (7 pages).
(Continued)

*Primary Examiner* — Emmanuel M Marcelo
*Assistant Examiner* — Juan J Campos, Jr.
(74) *Attorney, Agent, or Firm* — Brooks Kushman P.C.

(57) ABSTRACT

An embodiment relates to a mobile crane having an articulated body and an elongate boom attached to the body, the boom being for carrying a load when the crane is stationary and while the crane is mobile. The boom is articulated to provide a movement for lifting and lowering an end of the boom, and the boom is further articulated to provide a movement of the boom laterally. A further embodiment relates to controlling swing of a load carried at the end of a boom of a mobile crane by varying lateral orientation of the boom.

20 Claims, 9 Drawing Sheets

(56) References Cited

U.S. PATENT DOCUMENTS

| | | | | |
|---|---|---|---|---|
| 4,431,363 | A | 2/1984 | Waite | |
| 4,580,797 | A | 4/1986 | Ericsson | |
| 4,991,673 | A | 2/1991 | Ericsson | |
| 10,696,526 | B2 | 6/2020 | Weckbecker et al. | |
| 11,084,693 | B2 | 8/2021 | Weckbecker et al. | |
| 2004/0159370 | A1* | 8/2004 | Moisander | B66C 23/62 144/329 |
| 2016/0169413 | A1 | 6/2016 | Camacho et al. | |
| 2018/0044149 | A1 | 2/2018 | Weckbecker et al. | |
| 2018/0134528 | A1 | 5/2018 | Oka et al. | |
| 2019/0270622 | A1 | 9/2019 | Elvery | |
| 2022/0356050 | A1 | 11/2022 | McPherson | |

OTHER PUBLICATIONS

PCT International Search Report and Written Opinion, Dated Nov. 9, 2020, Application No. PCT/AU2020/051103, Applicant Terex Australia Pty Ltd, 10 Pages.

Chinese Office Action re CN Application No. 202080047592.6 dated Aug. 20, 2024, Applicant: Terex Australia Pty Ltd (with English Machine Translation) (28 pages).

* cited by examiner

MOBILE CRANE

CROSS-REFERENCE TO RELATED APPLICATIONS

This application is the U.S. national phase of PCT Application No. PCT/AU2020/051103 filed on Oct. 14, 2020, which claims priority to Australian Patent Application No. AU 2019903890 filed on Oct. 15, 2019, the disclosures of which are incorporated in their entireties by reference herein.

TECHNICAL FIELD

Embodiments relate to a pick and carry crane having an articulated boom.

BACKGROUND

A pick and carry crane is a crane which is able to move (i.e. travel) while it has a load suspended from a boom of the crane. Some pick and carry cranes are able to drive on public roads at highway speeds where they are classified as special purpose vehicles. The design of pick and carry cranes can vary depending on the application of the crane. Some designs of pick and carry cranes are more maneuverable compared to other crane types. For example, when the pick and carry crane is articulated, the whole crane can fit within a turning circle of the crane. This design feature can enable articulated pick and carry cranes to be used in tight or confined spaces to lift and move loads, such as on the floor of a manufacturing facility.

Pick and carry cranes can also take the form of "taxi cranes", i.e. cranes travelling with all equipment required to operate the crane through the full range of capability of that crane. Many cranes cannot operate as a taxi crane since they cannot transport all components required to operate, hence support vehicles are generally required to carry extra components, such as counterweights and rigging including slings & hooks.

In general, in pick and carry cranes, the same operator station is used to control the crane when travelling (such as on a public road) as when operating the crane at a facility. This "single cabin" arrangement helps to simplify crane configuration, and provides flexibility for the operator (i.e. by not having to move back and forth between a driver's cab and a crane cab).

Such pick and carry cranes have tipping lines defined by the points of contact between the crane and the ground (i.e. the tyres). So, when the moment about the tipping line is sufficient, the crane will tip, or fall, about the tipping line. There are many factors which can affect the extent of the moment about the tipping line ("tipping moment") such as boom extension, boom luff, load weight and weight distribution, incline of the ground and orientation of the crane relative to that incline, extend of crane articulation, swing of the load, etc.

Since pick and carry cranes are generally dimensioned to fit public roads, tipping can be a significant concern. Not only does tipping of the crane damage the crane, but also poses a significant safety concern to the operator of the tipped crane as well as any personnel in the vicinity who may be placed at risk by a tipping crane.

With other mobile cranes outriggers can be used to minimise susceptibility to sideways tipping. However, such outriggers are used when the crane is operating at a stationary position. Since pick and carry cranes need to travel with a load, this means that outriggers typically cannot be used.

It is to be understood that references herein to the prior art do not constitute an admission that such art forms a part of the common general knowledge of a person of ordinary skill in the art, in Australia or any other country.

SUMMARY

Embodiments relate to a mobile crane. The mobile crane may be a taxi crane. The mobile crane may be a pick and carry crane for operation on public roads. The mobile crane may lack outriggers. The mobile crane may be articulated. The mobile crane may have a single operator cabin for controlling the crane when travelling and for controlling the crane when lifting and/or moving a load.

An embodiment relates to a mobile crane having an articulated body and an elongate boom attached to the body, the boom being for carrying a load when the crane is stationary and while the crane is mobile, said boom being articulated to provide a movement for lifting and lowering an end of the boom, wherein the boom is further articulated to provide a movement of the boom laterally. The movement for lifting and lowering may provide a first degree of freedom for movement of the boom. The movement for lifting and lowering may be an up and down articulation. The lateral movement may provide a second degree of freedom for movement of the boom. The lateral movement may be a lateral articulation.

In an embodiment, the boom may be articulated about a first axis substantially perpendicular to a longitudinal axis of the crane. This articulation may correspond to the up and down articulation. The boom may be further articulated about an axis substantially parallel to a longitudinal axis of the crane. This articulation may correspond to the lateral articulation.

The mobile crane may have a first articulated joint for providing the lifting and lowering movement and a second articulated joint for providing the lateral movement.

The mobile crane may have an actuator for providing the lifting and lowering movement and the lateral movement. The actuator may be mechanical, pneumatic, hydraulic, electrical, or any combination thereof.

The actuator may comprise two rams, wherein the rams move to provide the lifting and lowering movement and/or the lateral movement.

The two rams may move in the same direction to provide the lifting and lowering movement, and wherein the two rams move in the same direction at different speeds, or in opposite directions, to provide the lateral movement.

The rams may be hydraulic.

In an embodiment, the two rams are symmetrically arranged with respect to the boom and the body of the crane.

In an alternative embodiment, the actuator may comprise two rams unsymmetrically arranged with respect to the boom and the body of the crane. A first ram may move to provide movement for lifting and lowering the end of the boom. A second ram may move to provide the movement of the boom laterally. When the boom is only lifted and lowered, the second ram may be stationary. When the boom is only moved laterally, the first ram may be stationary.

According to this embodiment, the control for lifting with the first ram may be independent from the control for lateral movement with the second ram therefore potentially being simpler to control each movement independently with just one ram for each movement. Other potential advantage may be that the second ram is positioned to one side of the boom (laterally) allowing space on the other side for a side cabin. The first ram may still be placed under the boom. This may also allow the boom to lower to a level below the height of the cabin.

The first ram may be attached to the boom at a medial line of the boom. The second ram may be attached to the boom at a side of the boom.

A further embodiment relates to a method of controlling a mobile crane, the mobile crane having an articulated body and an elongate boom attached to the body, the boom being for carrying a load when the crane is stationary and while the crane is mobile, said method comprising moving the boom for lifting and lowering an end of the boom and moving the boom laterally. The movement for lifting and lowering may provide a first degree of freedom for movement of the boom. The lateral movement may provide a second degree of freedom for movement of the boom.

The crane may comprise a first articulated joint for providing the lifting and lowering movement and a second articulated joint for providing the lateral movement.

The lifting and lowering movement and/or the lateral movement may be provided by an actuator. The actuator may be mechanical, pneumatic, hydraulic, electrical, or any combination thereof.

When the actuator comprises two rams, the method may comprise moving the rams to provide the lifting and lowering movement and the lateral movement.

The method may comprise moving both the rams in the same direction to provide the lifting and lowering movement, and moving the two rams in the same direction at different speeds, or in opposite directions, to provide the lateral movement.

A further embodiment relates to a method of controlling a tipping moment of a mobile crane, the mobile crane having an articulated body and an elongate boom attached to the body, the boom being for carrying a load when the crane is stationary and while the crane is mobile, said method comprising moving the boom laterally.

The method may further comprise lifting or lowering the boom to control the tipping moment.

The boom may be lifted or lowered at the same time as moving the boom laterally.

The boom may be lifted or lowered before or after moving the boom laterally.

A further embodiment relates to a method of controlling swing in a load, the load being borne by a mobile crane, the mobile crane having an articulated body and an elongate boom attached to the body, the boom being for carrying a load when the crane is stationary and while the crane is mobile, said method comprising moving the boom laterally in dependence on the swing.

The method may comprise measuring a swing of the load and moving the boom laterally in dependence on the measured swing.

A method for measuring swing could be via radar sensors, scanning the load in 3D, or motion sensors sensing dynamic movements and accelerations of the crane, boom, hook attachment/load. The boom would then be moved to counteract the momentum of the swinging load cancelling the swinging motion. This can be calculated with the known position and accelerations of the load and the known weights of the crane masses and the load mass which the crane measures via pressure transducers in the hydraulic rams lifting the boom.

BRIEF DESCRIPTION OF THE DRAWINGS

Embodiments are herein described, with reference to the accompanying drawings in which.

DETAILED DESCRIPTION

Figure 1:
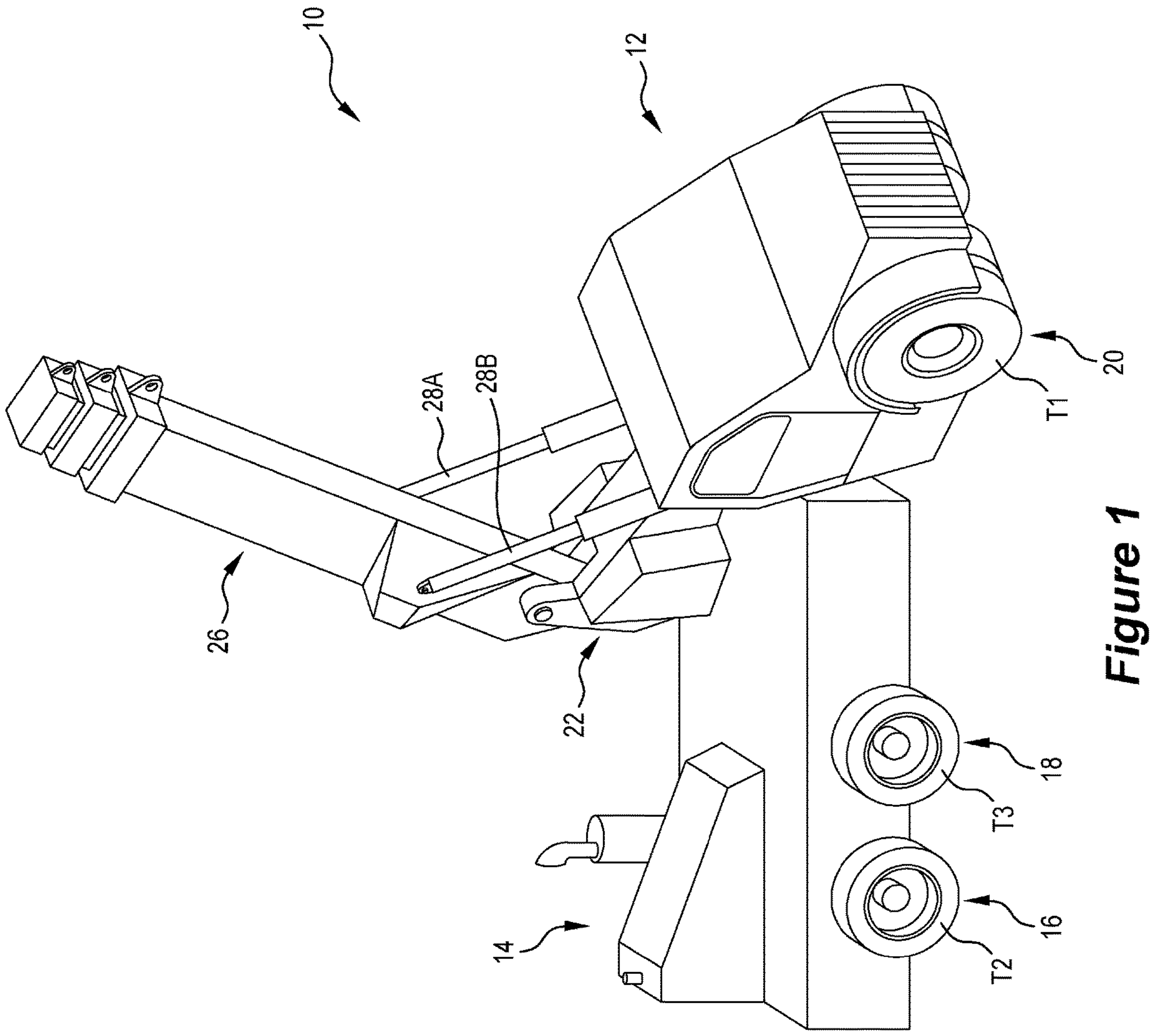
FIG. 1 shows a perspective view of an embodiment of a pick and carry crane.
Figure 2:
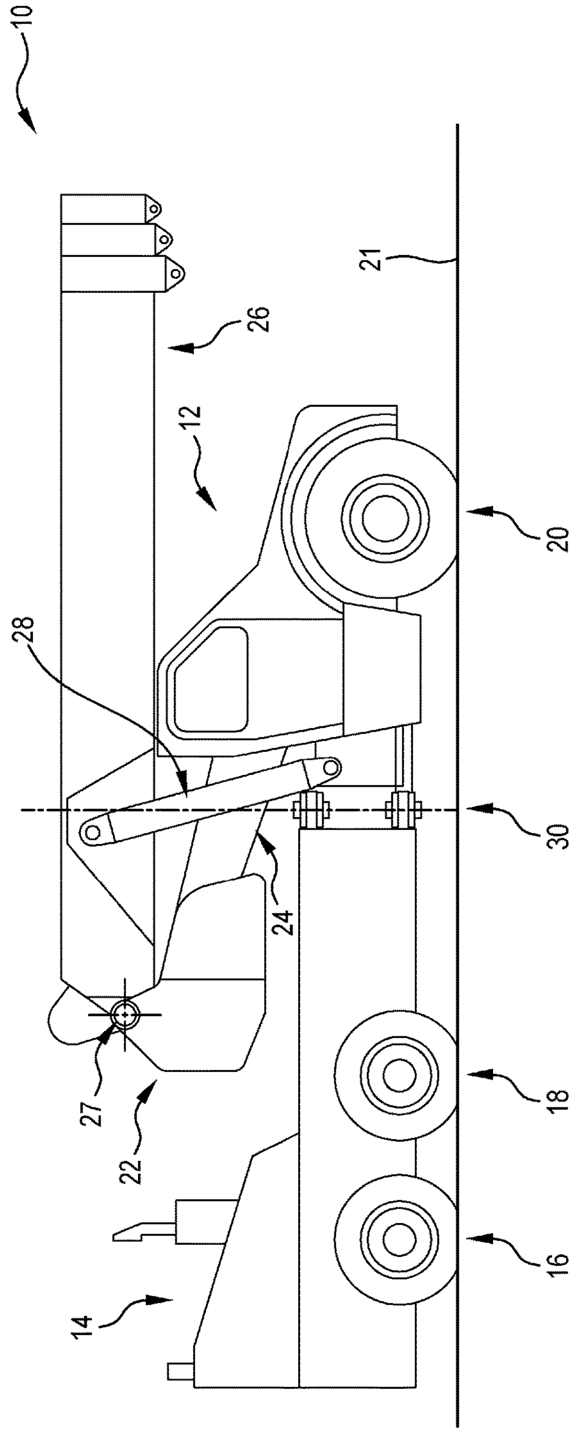
FIG. 2 shows a side view of the pick and carry crane.
Figure 3:
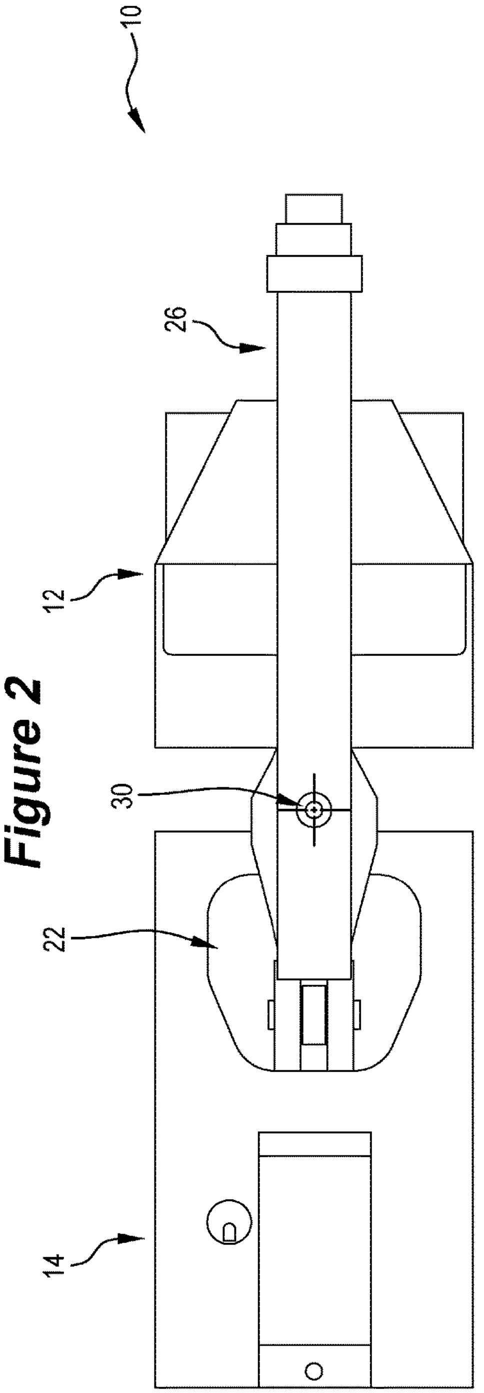
FIGS. 3 and 4 show plan views of the pick and carry crane.

FIGS. 1, 2 and 3 show a pick and carry crane 10. The crane 10 has a front body 12 which is the front part of the crane 10. The front body 12 is pivotally connected via a pivot arrangement 30 (exemplified by the dashed line in FIGS. 2 and 3) to a rear body 14 of the crane 10. The pivot point 30 is provided with moveable linkages (hydraulic rams in this instance although other linkages are known), to control the pivot angle of the front body 12 to the rear body 14. Adjusting the pivot angle using the moveable linkages helps to turn the crane 10.

Figure 4:
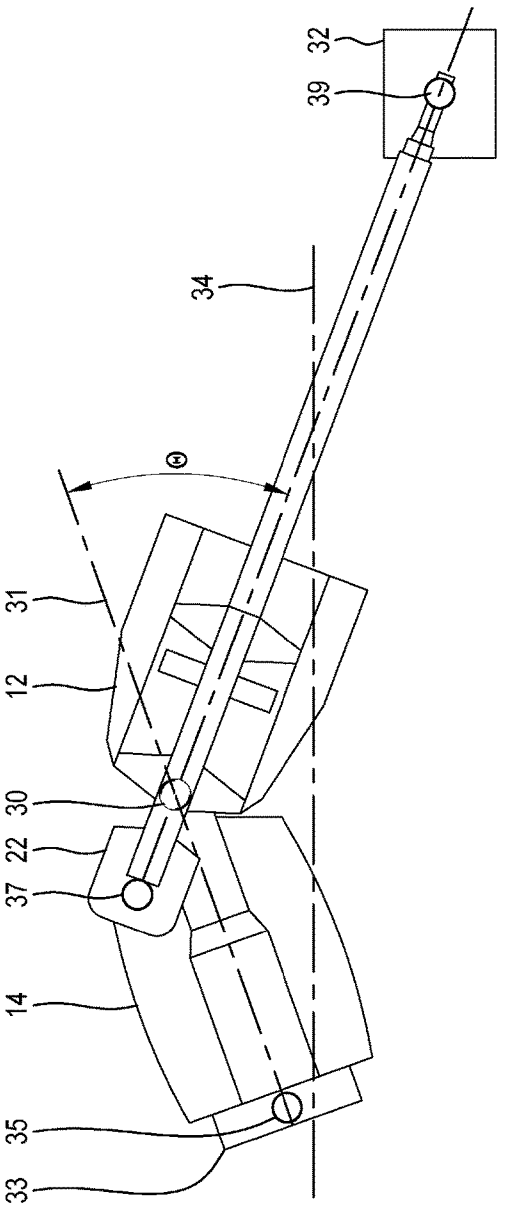

A side tipping line 34 (see FIG. 4) is defined when the front body 12 is pivoted relative to the rear body 14.

In the embodiment of the pick and carry crane 10 as depicted in the Figures, the side tipping line 34 is an imaginary longitudinal axis that extends between a point at which the outer tyres T1 of the front body contact the ground, via wheel 20, and a point at which the outer tyre T3 of the rear body contacts the ground, via wheel 18. Thus, the tyres T1 and T3 of the wheels 20 and 18 define the points about which the crane may topple sideways. The crane 10 includes two sets of rear tyres T3 and T2. In this embodiment, the foremost set T3 is used to define the tipping line as the rearmost set T2 can be lifted during a taxi mode so that those tyres are no longer in contact with the road or other travel surface.

The pick and carry crane illustrated has three axles, but is to be realised that in different embodiments, the mobile crane may have two axles, or more than three axles.

Attached to the rear end of the front body 12 is a boom support arm 24. The boom support 24 may be a separate structure that is mounted e.g. welded or bolted to the front body 12. In an embodiment, the boom support arm 24 forms part of the chassis of the front body 12. The boom support arm 24 pivotally supports boom 26, where the boom 26 is raised and lowered about the pivot point, represented by pin 27 (FIG. 2), using linear actuators in the form of hydraulic rams 28A and 28B, between the front body 12 and the boom 26. The boom 26 is telescopic. Other forms of linear actuators and booms can be used in place of or in addition to rams 28 and boom 26.

Figure 5:
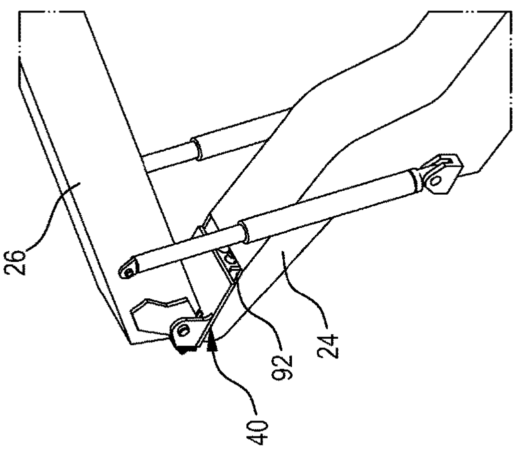

FIG. 5 illustrates the joins between the boom 26 and the boom support arm 24. Embodiments employ boom articulation which allows both up and down articulation as well as side to side articulation of the boom. In the embodiment illustrated in FIG. 5, a dual articulation joint 40 provides both forms of articulation.

Figure 6:
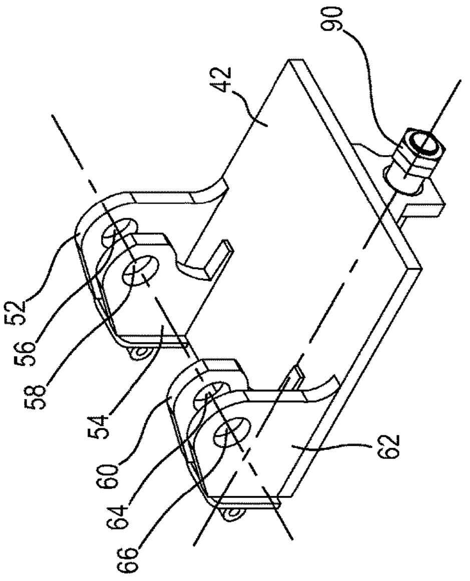
FIGS. 5 to 8 illustrate articulation joints linking the boom to the front body of the pick and carry crane.

FIG. 6 illustrates a top view of plate 42 used in the articulation joint 40.

Figure 7:
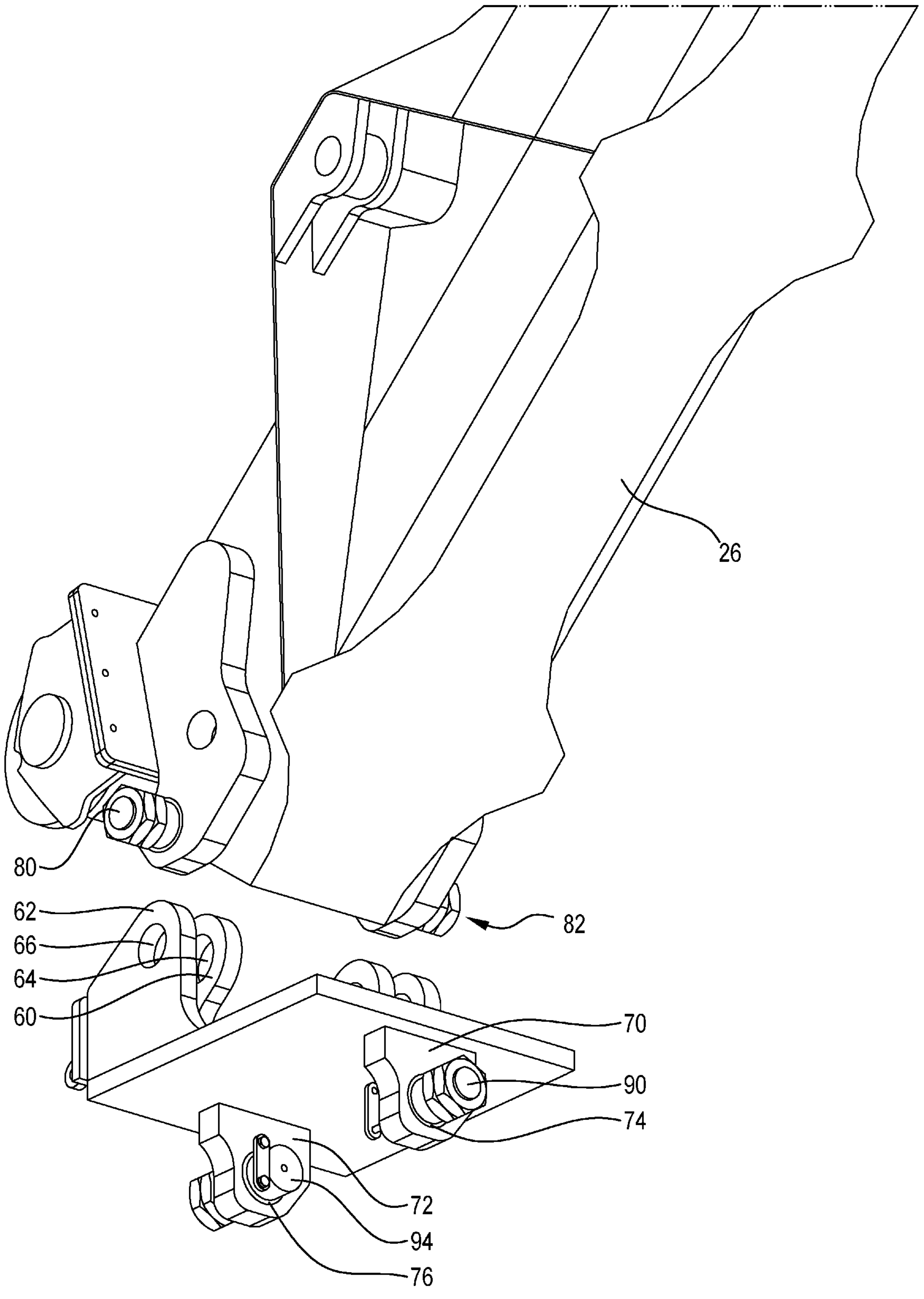

FIG. 7 illustrates the underside of the plate 42 and how the plate 42 engages with the boom 26. The plate 42 is provided with brackets 52, 54, 60 and 62 on an upper surface with corresponding circular voids 56, 58, 64 and 66 formed therein. Brackets 70 and 72 are provided on an under surface of plate 42 with circular voids 74 and 76 formed therein, as illustrated in FIG. 7.

Provided on the underside of the boom 26 are two pins 80 and 82. In use, the pins 80 and 82 of boom 26 are engaged with the voids 56, 58, 64 and 66 of the brackets 52, 54, 60 and 62 of plate 42. The pins 80 and 82 allow the boom to pivot up and down relative to the plate 42.

Figure 8:
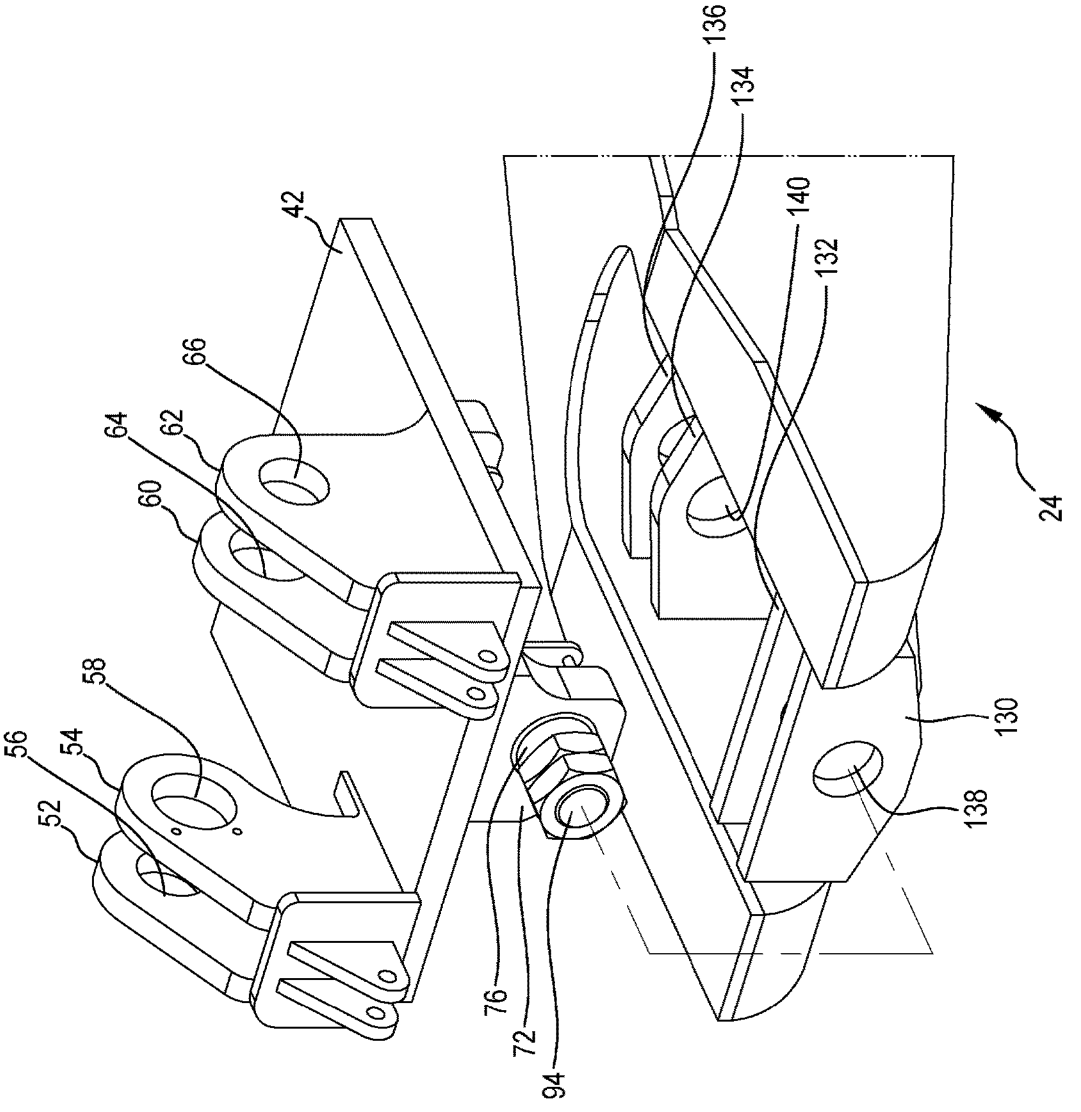

As illustrated in FIG. 8, the boom support arm 24 is provided with plates 130, 132, 134 and 136 with respective voids formed therein (only void 138 in plate 130 and void 140 in plate 134 are visible in FIG. 8). The pins 90 and 94 engage with the voids formed in the plates 130, 132, 134 and 126. The lower brackets 70 and 72 of plate 42 engage with the pins 90 and 94 provided on the boom support arm 24 (FIG. 6). This join then allows the plate 42 to pivot laterally (with respect to the longitudinal axis of the boom 26). The boom 26 is thereby able to pivot laterally.

As illustrated in FIG. 5, the plate 42 is accommodated in a recess 92 in the boom support arm 24 and the recess is dimensioned relative to the dimensions of the plate 42 so that the amount of lateral movement of the boom is restricted. In this embodiment, the lateral movement of the boom 26 is restricted to 5° either side of the vertical so that the total lateral movement of the boom is restricted to 10°.

In an alternate embodiment, the total lateral movement of the boom is restricted to 20°, 10° to either side of the vertical.

Figure 9:
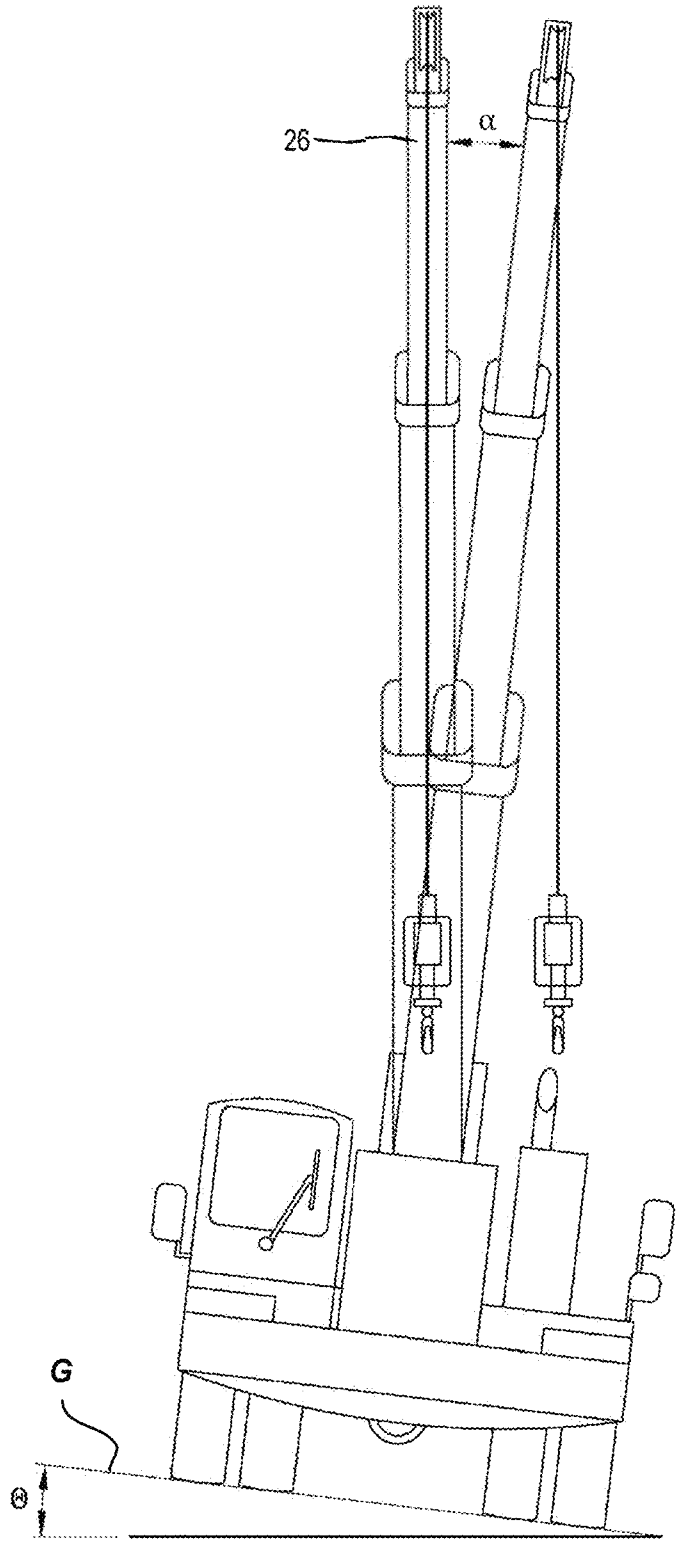
FIG. 9 illustrates lateral articulation of the boom of the pick and carry crane.
Figure 10:
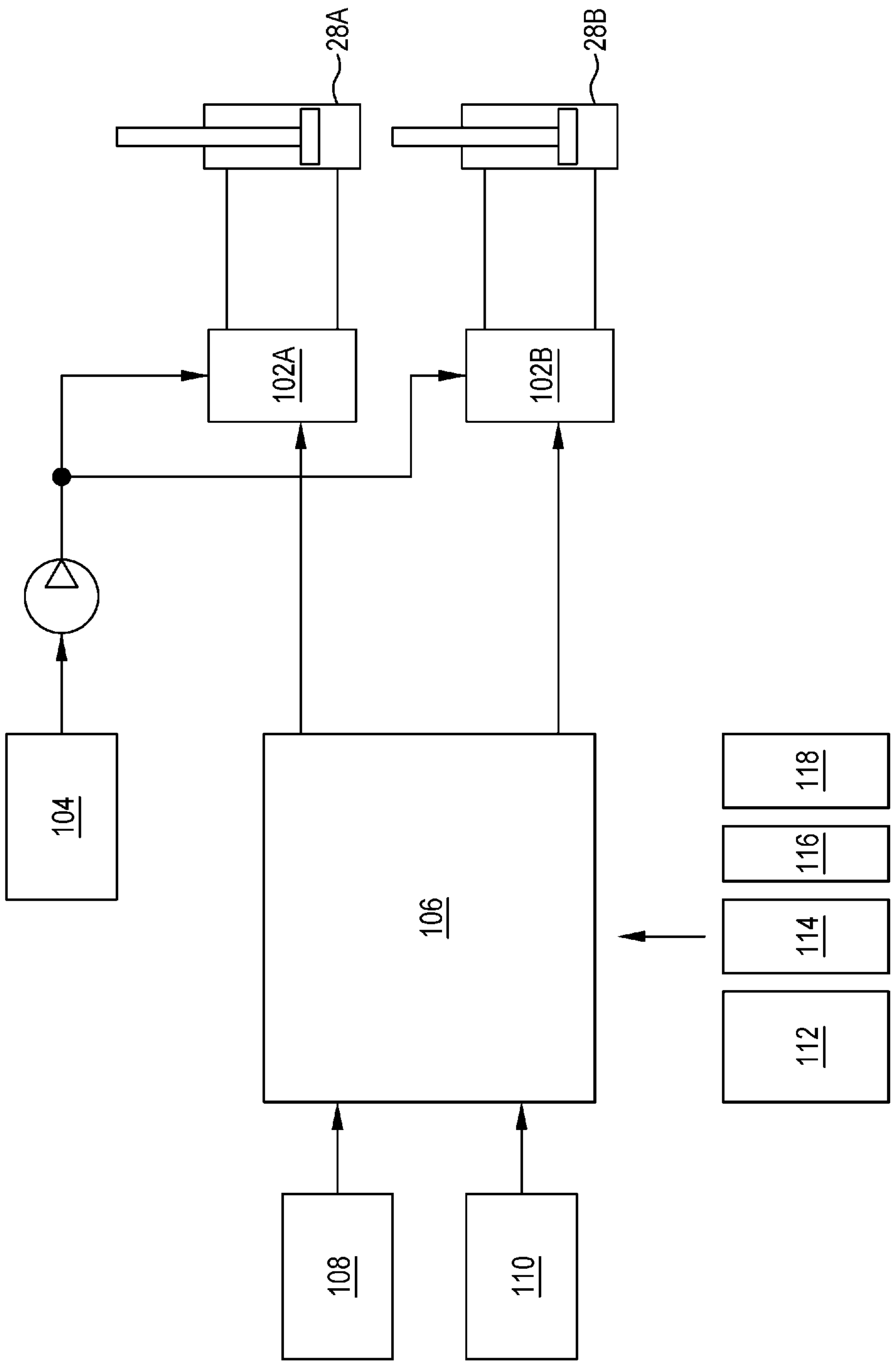
FIG. 10 is a schematic drawing illustrating a portion of the control system for the boom of the pick and carry crane.

FIG. 9 illustrates the lateral articulation of the boom 26 at an angle α. As shown the pick and carry crane 12 is here depicted on slanted terrain G at an angle Θ relative to the horizon. The slope of the terrain G will move the centre of gravity away from the centre of the pick and carry crane, thereby increasing the tipping moment, destabilizing the crane. By laterally articulating the boom 26 as illustrated, the centre of gravity is brought back towards the centre of the crane, thereby reducing the tipping moment and potentially improving the stability.

In alternate embodiments, the extent of the lateral movement may be set depending on a number of factors such as the maximum length of the boom when extended, the capacity of the crane, operating conditions etc.

The hydraulic rams 28A and 28B control both the up and down articulation of the boom 26 as well as the lateral articulation. For certain embodiments there may be an advantage to using hydraulic rams to control both up and down, and lateral articulation since known pick and carry cranes include such hydraulic rams. Therefore, it is not necessary to develop and install a new articulation mechanism to accommodate the lateral articulation in addition to the existing up and down articulation.

FIG. 9 illustrates a control system 106 for controlling the articulation of the boom 26. The control system 106 is connected to two directional control valves 102A and 102B which are connected to the respective hydraulic rams 28A and 28B. An oil supply 104 is connected to the directional control valves 102A and 102B. This provides the oil used as hydraulic fluid in the system.

By controlling the directional control valves 102A and 102B, the control system 106 controls the movement of the rams 28A and 28B thereby controlling the articulation of the boom 26. By moving the rams in the same direction at the same speed at the same time, the boom 26 will articulate only up or down. By moving only one of the rams, or both of the rams at different speeds or in different directions, the control system 106 is able to control the lateral articulation of the boom 26.

The control system is further connected to a mode selector 108 whereby a user selects the mode of the crane as manual mode or automatic mode and a command input 110 which a user may use to control the boom. Various sensors are also connected to the control system: a boom lateral angle sensor 112, a chassis angle sensor 114, a wheel speed sensor 116 and an engine RPM sensor 118.

The control system 106 uses the input from the operator comments and the sensors to control the lateral boom angle. For example, if the mode selector is in automatic mode, and the chassis angle sensor detects a slant, the control system will tilt the boom laterally in the opposite direction to compensate for the slant in the chassis.

It is to be realised that other sensors may additionally be used. For example, a boom extension sensor; a boom up-down articulation sensor; crane articulation sensor, load height sensor, load swing sensor etc. The extent to which the boom is laterally articulated will take all of these factors into account to potentially improve the stability of the crane.

FIGS. 11A to 11D illustrate a portion of a pick and carry crane according to an alternate embodiment. Similar reference numbers are used to denote similar features. As with the embodiment of FIGS. 1 to 10, the embodiment illustrated in FIGS. 11A to 11D, comprises a boom support arm 24 attached to the boom 126 by base plate 142. The connection points provide two axes of articulation so that the boom 26 can move up and down, and side to side relative to the body of the crane.

The embodiment illustrated in FIGS. 1 to 10 has the two hydraulic rams 28A and 28B attached to the lateral sides of boom 26 and are symmetrically arranged relative to the boom 26. In the embodiment of FIGS. 11A to 11D, two rams 128A and 128B attach between the boom 126 and the base plate 142 with the ram 128A attached to the boom at a medial line 130 (FIG. 11C) and boom 128B attached at the side of the boom at point 132.

Therefore, the rams 128A and 128B are attached asymmetrically between the boom 126 and the base plate 142. Therefore, the up and down movement of the boom 126 is controlled by the ram 128A and the side to side movement of the boom 126 is controlled by the ram 128B.

Figure 11A:
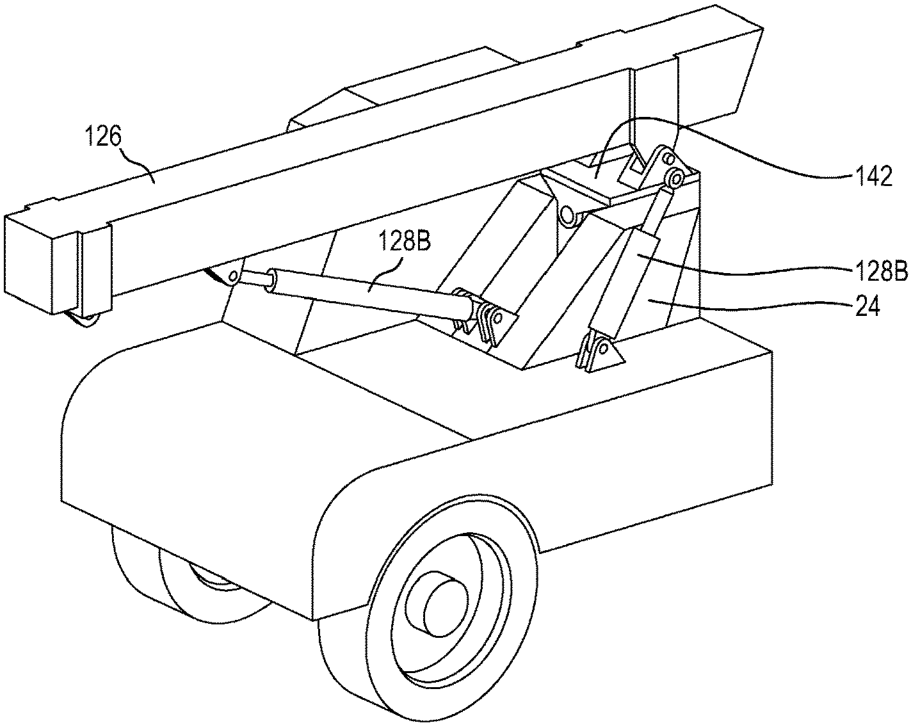
FIGS. 11A to 11D illustrate an alternate embodiment of a pick and carry crane.
Figure 11B:
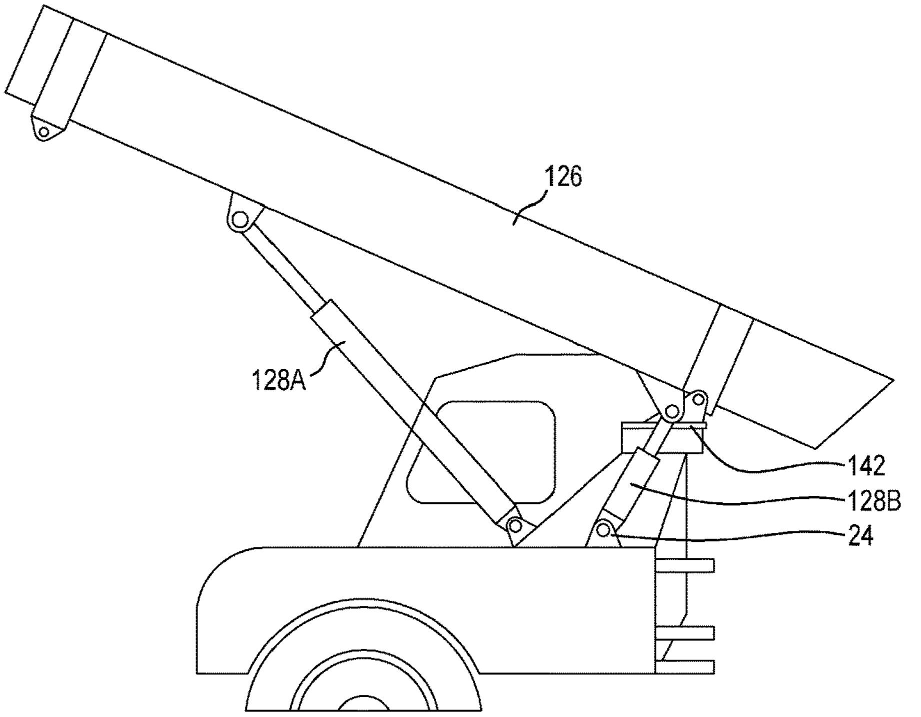

FIGS. 11A and 11B illustrate the different configurations of the mobile crane when the boom 128A is activated. FIG. 11A illustrates the boom 126 in a down position and FIG. 11B illustrates the boom in the up position, movement between these two configurations being achieved by activation of the ram 128A.

Figure 11C:
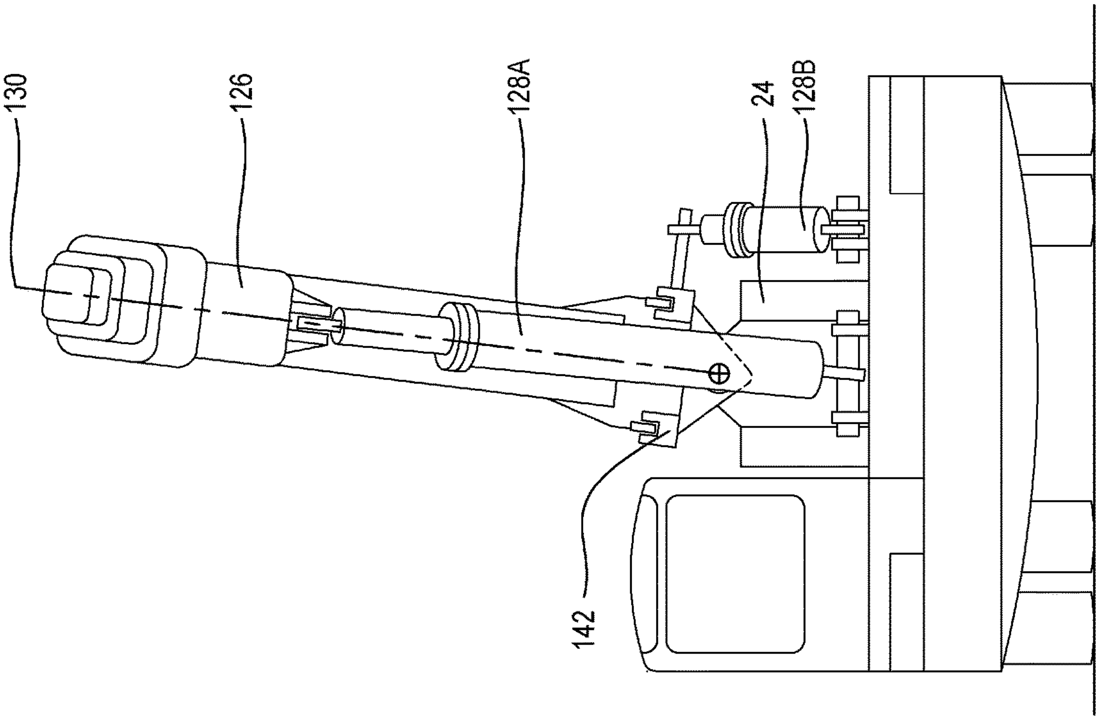
Figure 11D:
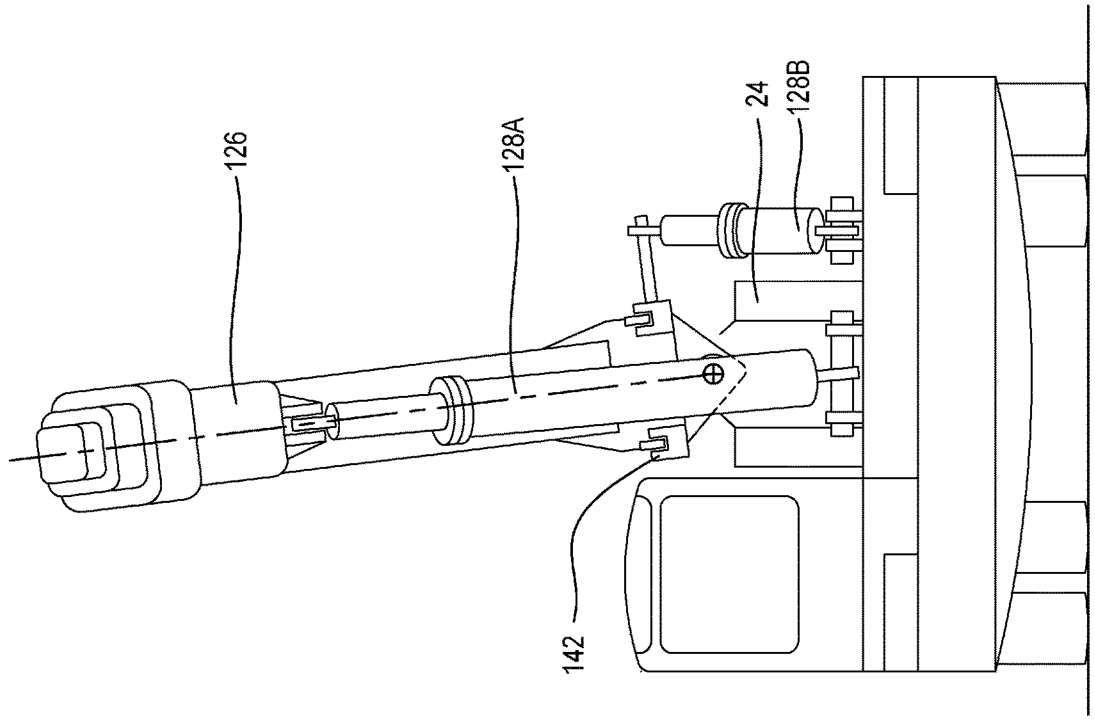

FIG. 11C illustrates the boom 126 in the left (in the direction of travel) configuration and FIG. 11D illustrates the boom 126 in the right configuration. The boom moves between the configurations of FIGS. 11C and 11D by activation of the ram 128B.

It is to be realised that it is not necessary to activate the rams 128A and 128B independently; they could be activated together to move the boom simultaneously up and down, and left and right. The control system illustrated in FIG. 10 and described above is equally applicable to the embodiment of FIGS. 11A to 11D.

A further embodiment relates to control of swing of the load. In this embodiment, the operator controls the lateral articulation of the boom to reduce or stop swinging in the load. By timing the lateral articulation of the boom, the operator is able to dampen the swing of the load which may improve the stability of the crane since load swing can induce tipping of the crane.

To determine the swing, various measurements of the position of the load relative to the boom are made. These measurements are made using radar sensors, scanning the load in 3D, or motion sensors sensing dynamic movements and accelerations of the crane, boom, hook attachment/load.

The boom is then moved to counteract the momentum of the swinging load cancelling the swinging motion. The amount of movement required can be calculated with the known position and accelerations of the load and the known weights of the crane and the load mass which the crane measures via pressure transducers in the hydraulic rams lifting the boom.

Features of pick and carry cranes relating to the control of tipping are described in PCT/AU2014/000261, PCT/AU2017/050999 and AU2018903904, the contents of which are incorporated herein. It is to be realised that the lateral articulation of the boom as herein described could be incorporated in the tipping prevention considerations and controls discussed in those applications.

The invention claimed is:

1. A mobile crane comprising an articulated body, the articulated body comprising a rear chassis and a front chassis attached for articulated movement to the rear chassis, the front chassis comprising an operator cabin, the mobile crane further comprising an elongate boom attached to the body, the boom being for carrying a load when the crane is stationary and while the crane is mobile, the boom being articulatable to provide a movement for lifting and lowering an end of the boom, wherein the boom is further articulatable to provide a movement of the boom laterally;

the mobile crane further comprising an actuator for providing the lifting and lowering movement and/or the lateral movement, the actuator comprising two rams, wherein the rams are movable to provide the lifting and lowering movement and the lateral movement, and wherein the two rams are connected to the boom and the front chassis so that the two rams are arranged between the boom and the front chassis.

2. The mobile crane according to claim 1 having a first articulated joint for providing the lifting and lowering movement and a second articulated joint for providing the lateral movement.

3. The mobile crane according to claim 1 wherein the two rams are movable in a same direction to provide the lifting and lowering movement, and wherein the two rams are movable in a same direction at different speeds, or in opposite directions, to provide the lateral movement.

4. The mobile crane according to claim 1 wherein the rams are symmetrically arranged with respect to the boom and the body of the crane.

5. The mobile crane according to claim 1 wherein the two rams are unsymmetrically arranged with respect to the boom and the body of the crane.

6. The mobile crane according to claim 5 wherein a first ram of the two rams is movable to provide movement for lifting and lowering the end of the boom.

7. The mobile crane according to claim 6 wherein a second ram of the two rams is movable to provide the movement of the boom laterally.

8. The mobile crane according to claim 5 wherein a first ram of the two rams is attached to the boom at a medial line of the boom.

9. The mobile crane according to claim 5 wherein one ram of the two rams is attached to the boom at a side of the boom.

10. The mobile crane according to claim 1 wherein the rams are hydraulic.

11. The mobile crane according to claim 1 wherein one of the rams is connected directly to the boom.

12. The mobile crane according to claim 1 wherein each of the rams is connected directly to the boom.

13. The mobile crane according to claim 1 wherein the boom comprises a telescopic boom.

14. A method of controlling a mobile crane, the mobile crane having an articulated body comprising a rear chassis and a front chassis attached for articulated movement to the rear chassis, the front chassis comprising an operator cabin, the mobile crane further comprising an elongate boom attached to the body, the boom being for carrying a load when the crane is stationary and while the crane is mobile, the mobile crane further comprising an actuator comprising two rams c ted to the boom and the front chassis so that the two rams are arranged between the boom and the front chassis, wherein the method comprises moving the rams for lifting and lowering an end of the boom and for moving the boom laterally.

15. The method according to claim 14 wherein the crane comprises a first articulated joint for providing the lifting and lowering movement and a second articulated joint for providing the lateral movement.

16. The method according to claim 14 comprising moving both the rams in a same direction to provide the lifting and lowering movement, and moving the two rams in a same direction at different speeds, or in opposite directions, to provide the lateral movement.

17. The method according to claim 14 comprising moving a first ram of the two rams to provide the lifting and lowering movement and moving a second ram of the two rams to provide the lateral movement.

18. The method according to claim 14 wherein one of the rams is connected directly to the boom.

19. The method according to claim 14 wherein each of the rams is connected directly to the boom.

20. The method according to claim 14 wherein the boom comprises a telescopic boom.

* * * * *